(12) United States Patent
Hasenei

(10) Patent No.: US 9,772,745 B2
(45) Date of Patent: Sep. 26, 2017

(54) METHODS AND SYSTEMS FOR FACILITATING A NAVIGATION OF A FACILITY

(71) Applicant: HENDRICKS INVESTMENT HOLDINGS, LLC, Silver Spring, MD (US)

(72) Inventor: Stephen Ignatius Hasenei, Silver Spring, MD (US)

(73) Assignee: HENRICKS INVESTMENT HOLDINGS, LLC, Silver Spring, MD (US)

( * ) Notice: Subject to any disclaimer, the term of this patent is extended or adjusted under 35 U.S.C. 154(b) by 156 days.

(21) Appl. No.: 13/785,790

(22) Filed: Mar. 5, 2013

(65) Prior Publication Data

US 2013/0239037 A1 Sep. 12, 2013

Related U.S. Application Data

(60) Provisional application No. 61/607,336, filed on Mar. 6, 2012, provisional application No. 61/607,876, filed on Mar. 7, 2012.

(51) Int. Cl.
*G06F 3/0482* (2013.01)
*G06F 17/30* (2006.01)

(52) U.S. Cl.
CPC ...... *G06F 3/0482* (2013.01); *G06F 17/30899* (2013.01)

(58) Field of Classification Search
CPC ......... G06F 3/0481; G06F 2203/04806; G06F 3/0482

USPC ........ 715/708, 771, 811, 835–839, 853–855, 715/864
See application file for complete search history.

(56) References Cited

U.S. PATENT DOCUMENTS

| | | | | |
|---|---|---|---|---|
| 5,907,850 A | * | 5/1999 | Krause et al. | 715/234 |
| 6,388,688 B1 | * | 5/2002 | Schileru-Key | 715/854 |
| 7,587,061 B1 | * | 9/2009 | Pacenti | 382/100 |
| 7,823,068 B2 | * | 10/2010 | Cowtan et al. | 715/738 |
| 7,913,185 B1 | * | 3/2011 | Benson et al. | 715/808 |
| 8,000,892 B2 | * | 8/2011 | Banerjee | 701/433 |
| 8,407,225 B2 | * | 3/2013 | Lahcanski et al. | 707/738 |
| 8,635,557 B2 | * | 1/2014 | Geise et al. | 715/850 |
| 8,836,580 B2 | * | 9/2014 | Mendelson | 342/463 |

(Continued)

FOREIGN PATENT DOCUMENTS

| | | | | | |
|---|---|---|---|---|---|
| EP | | 2163974 A1 | * | 3/2010 | G01C 21/20 |
| IT | WO 2009130729 A2 | | * | 10/2009 | G01C 21/3638 |

*Primary Examiner* — Andrew Tank
(74) *Attorney, Agent, or Firm* — Arent Fox LLP

(57) ABSTRACT

Systems and methods for providing a navigational tool usable on a web platform or on a smart device platform, where a user may interactively navigate a given facility and obtain desired information faster and more efficiently than via conventional applications that do not offer interactivity. One or more hot spots are provided on an image of the facility, and when a selection of one of the hot spots is received from the user, other hot spots, text, images and videos are provided to the user, wherein the hot spots are embedded in a displayed image of the facility, each hot sport corresponding to a specific portion of the facility, and a selection of a hot spot by the user provides the user with at least one of menus, text, images and videos related to the portion of the facility to which the hot spot corresponds.

17 Claims, 15 Drawing Sheets

(56) References Cited

U.S. PATENT DOCUMENTS

| | | | |
|---|---|---|---|
| 2002/0120395 A1* | 8/2002 | Smith | 701/208 |
| 2004/0030706 A1* | 2/2004 | Evans | 707/100 |
| 2004/0176108 A1 | 9/2004 | Misikangas | |
| 2006/0146719 A1* | 7/2006 | Sobek et al. | 370/238 |
| 2006/0197781 A1* | 9/2006 | Arutunian | 345/629 |
| 2008/0010605 A1* | 1/2008 | Frank | 715/765 |
| 2008/0222538 A1* | 9/2008 | Cardu | 715/760 |
| 2009/0049408 A1* | 2/2009 | Naaman | G06F 3/0482 715/835 |
| 2009/0265105 A1* | 10/2009 | Davis et al. | 701/300 |
| 2010/0069035 A1* | 3/2010 | Johnson | 455/404.1 |
| 2010/0106801 A1* | 4/2010 | Bliss et al. | 709/219 |
| 2010/0115407 A1* | 5/2010 | Kim et al. | 715/708 |
| 2010/0118025 A1* | 5/2010 | Smith | G06Q 30/02 345/418 |
| 2012/0179965 A1* | 7/2012 | Taylor | G06F 3/0346 715/705 |
| 2013/0103306 A1* | 4/2013 | Uetake | 701/425 |

\* cited by examiner

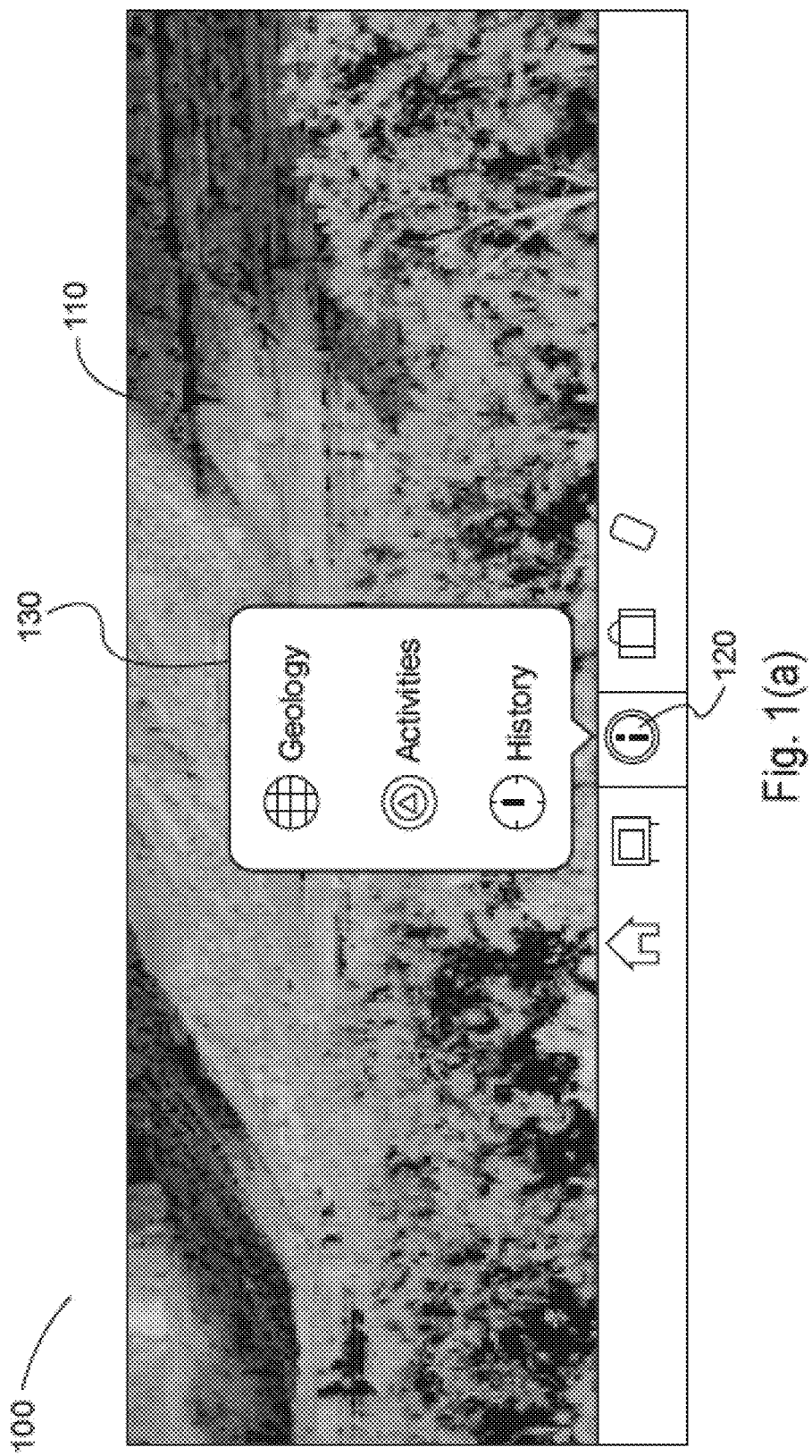

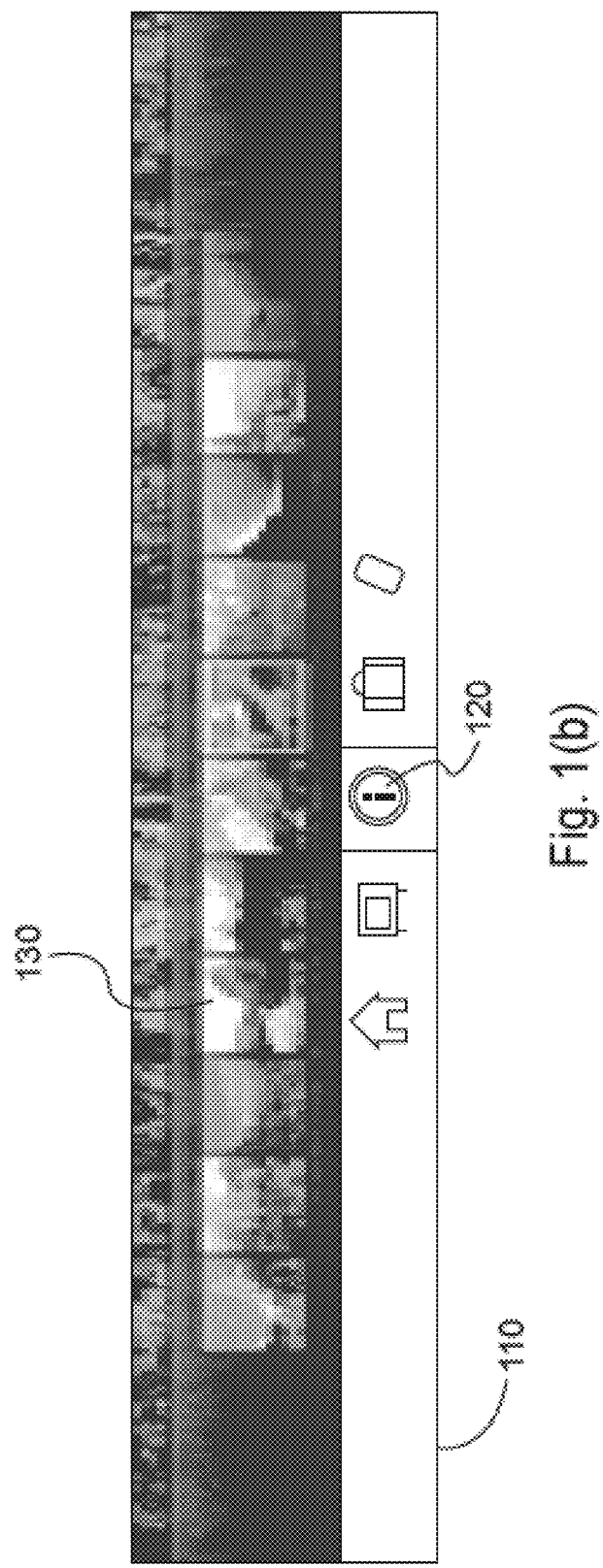

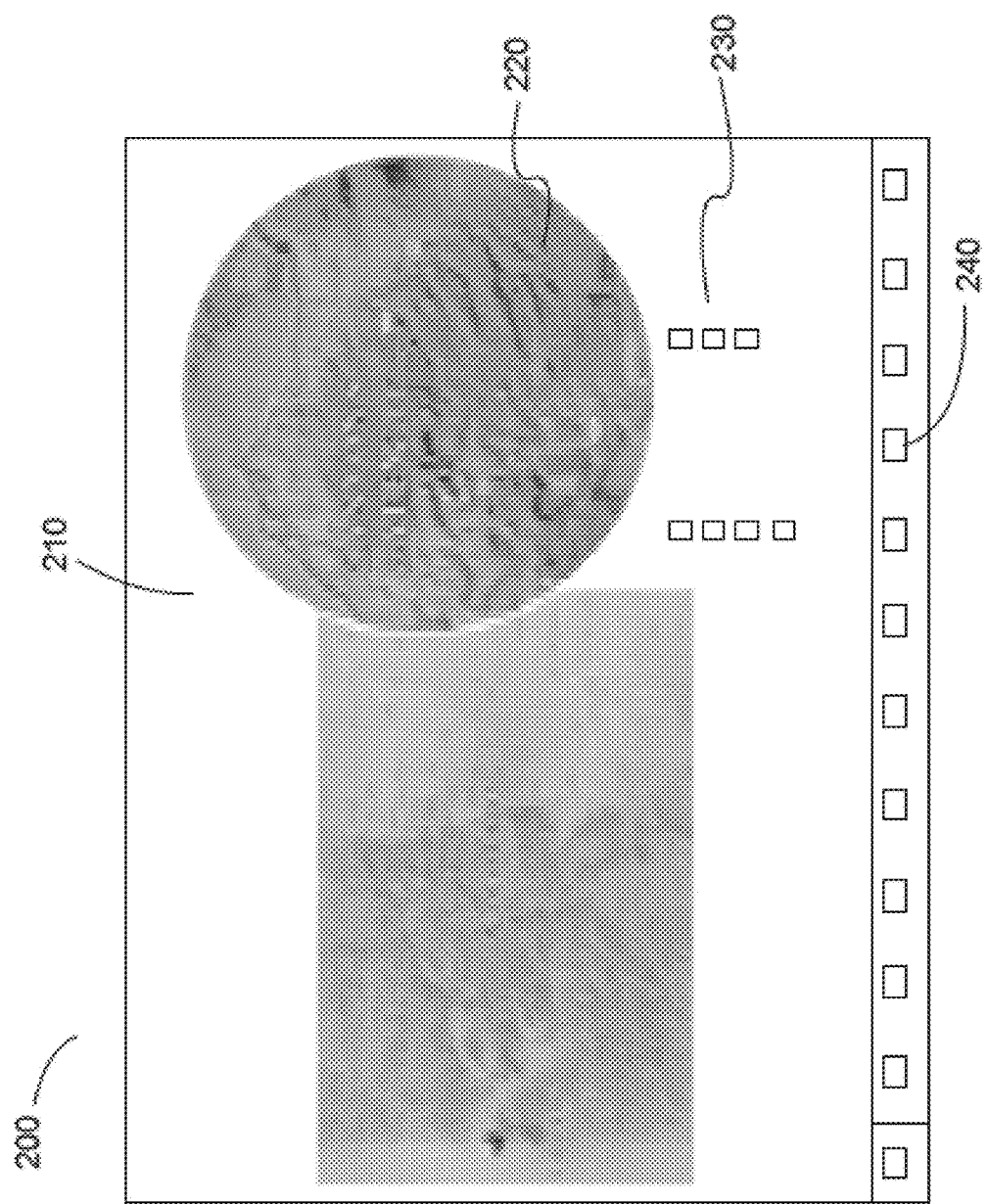

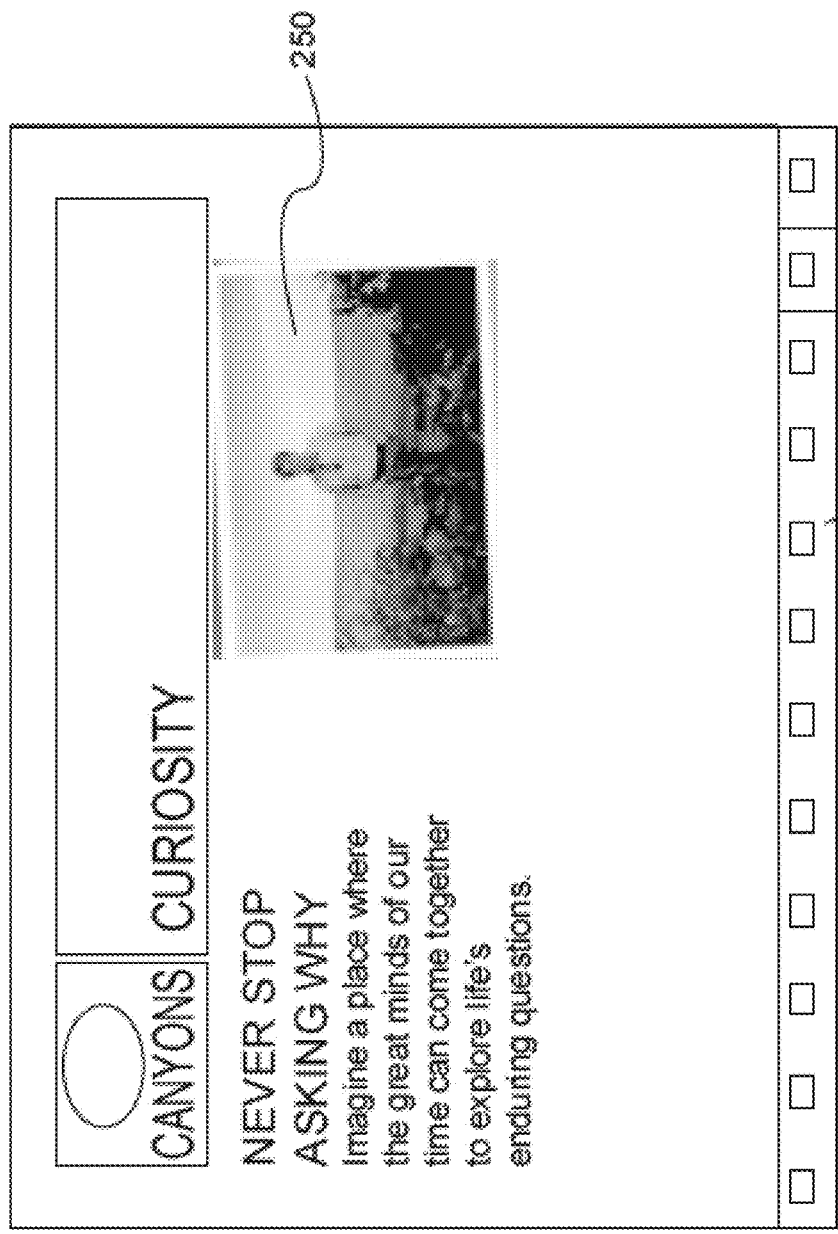

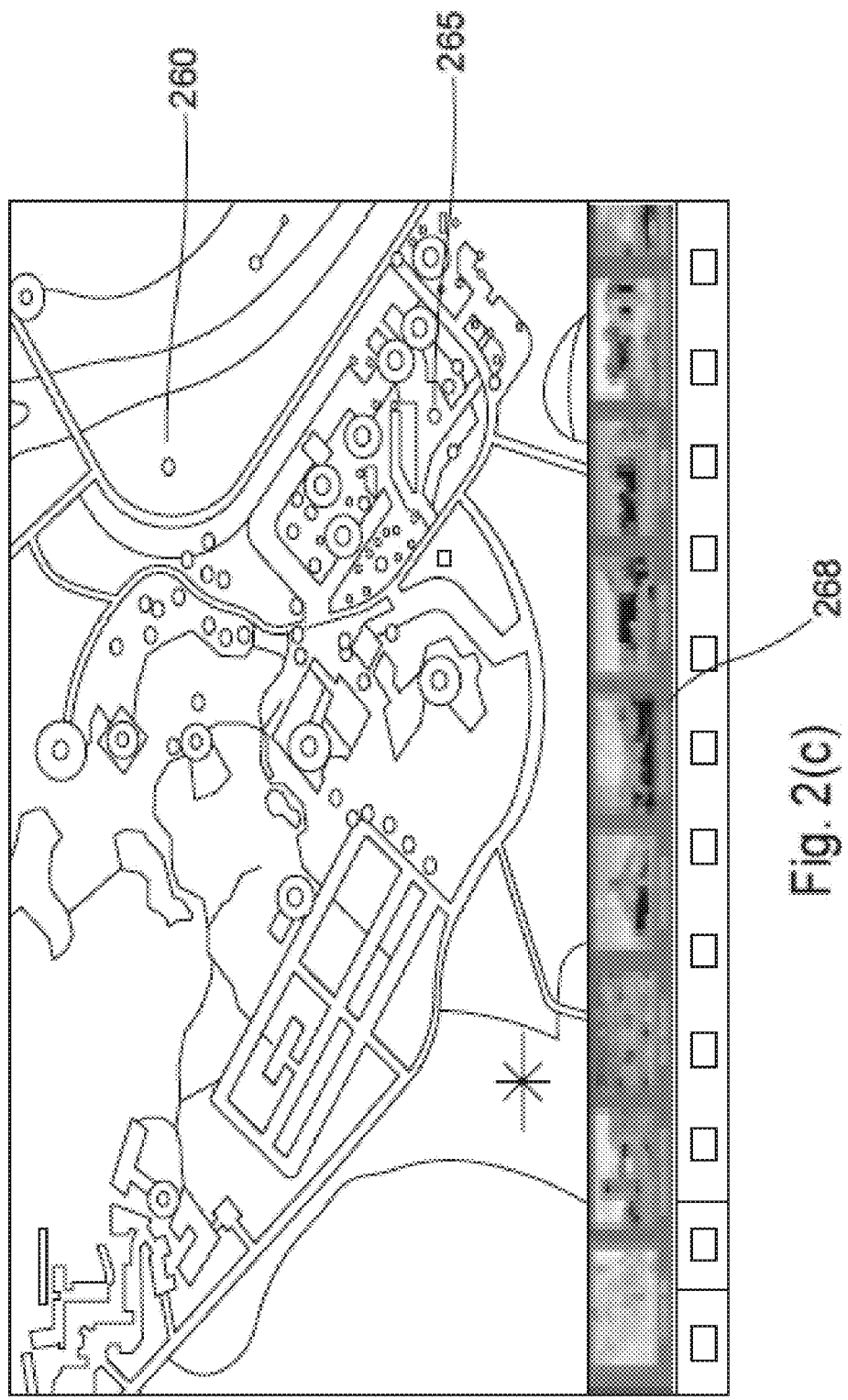

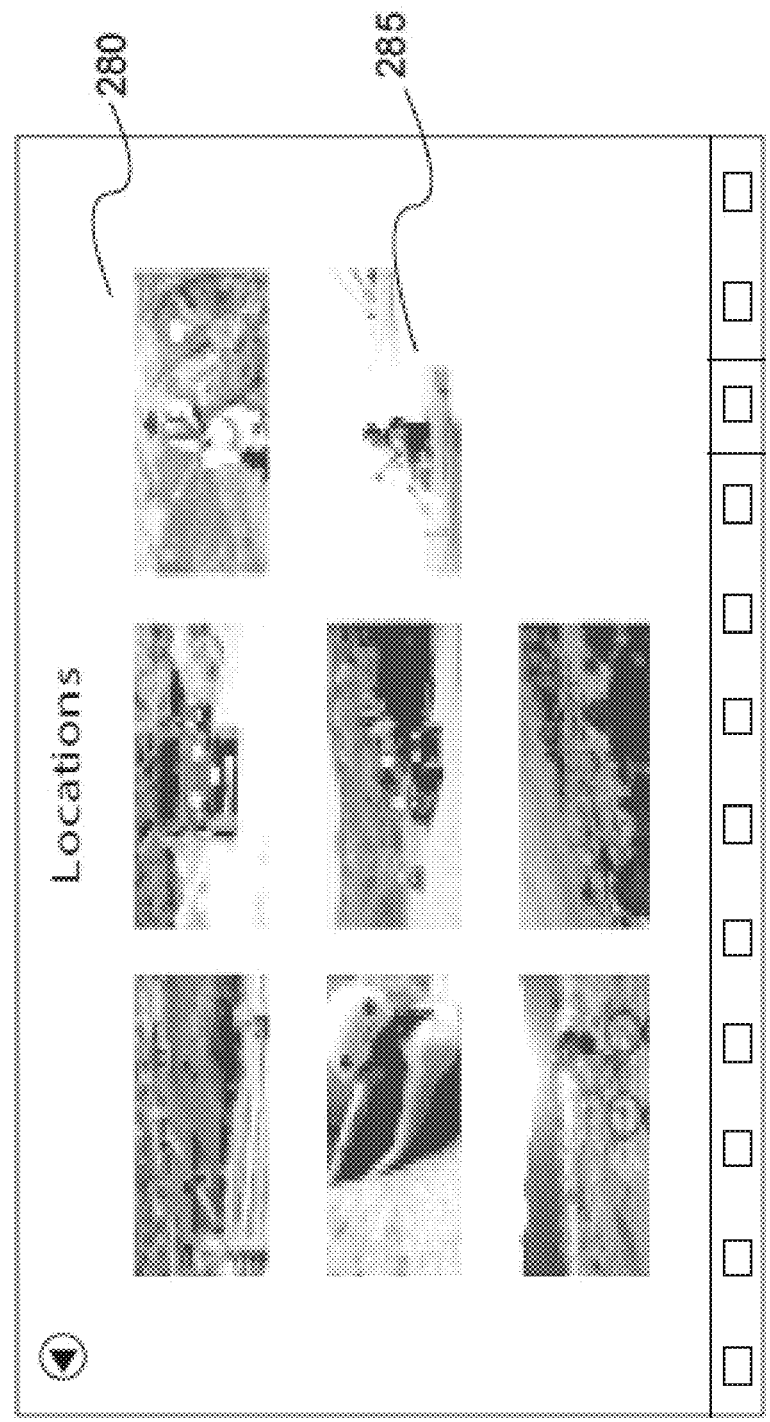

though, the user may obtain a desired information from various menus and sub-menus of the current invention faster and more efficiently than via conventional applications.

METHODS AND SYSTEMS FOR FACILITATING A NAVIGATION OF A FACILITY

The present application claims priority from provisional U.S. Patent Application No. 61/607,336, filed on Mar. 6, 2012, titled "Methods and Systems for Facilitating a Navigation of a Facility," and U.S. Patent Application No. 61/607,876, filed on Mar. 7, 2012, titled "Methods and Systems for Facilitating a Navigation of a Facility," which are incorporated herein by reference in their entirety.

BACKGROUND OF THE INVENTION

1. Field of Invention

Aspects of the present invention relate to methods and systems for facilitating the navigation of a facility. More particularly, aspects of the current invention relate to methods and systems for facilitating navigation of a facility via a web or smart device platform.

2. Description of Related Art

Most web or smart device applications that describe a facility, such as a dwelling, a location, or a vacation facility, the device application being, for example, smart phone applications, merely display to a user a series of graphics, including information that the user may view. However, most of these applications do not provide any interactivity to the user and are merely rigid repositories of information.

A Content Management System (CMS) or Web Management System (WMS) is a software program or a group or suite of applications and tools that allow publishing and formatting of digital content in a consistent and structured manner to create, edit, review and publish electronic text. A CMS typically supports collaborative publishing, allowing varying levels of access to different content managers, and ensures that content is structured consistently, which improves how information and data are provided and shared. Many content management systems offer a Web-based graphical user interface (GUI), enabling publishers to access the CMS online using a Web browser.

SUMMARY OF THE INVENTION

In light of the above described problems and unmet needs, aspects of the current invention provide systems and methods of providing a navigational tool usable on a web platform or on a smart device platform, where a user may interactively navigate a given facility or location and obtain desired information faster and more efficiently than via conventional applications that do not offer interactivity.

Various aspects of the current invention provide a Content Management System (CMS) usable on a web platform or a smart device platform, such as an application usable on an iPhone or iPad device. According to various aspects, most or all content for various menus and submenus presented to a user may be entered into the CMS, and the CMS may input the information into the smart device application. For example, the CMS may provide a user with the ability to manage all internal content of the smart device application, including images, videos, text, and the like. The CMS may also provide a user with the ability to update and manage the various images, videos, icons, other graphic elements of the application, and the like, without changing the core structure and base functionality of the application, such as navigation tools, user interaction, animation and data structure. According to various aspects, the CMS may also provide the ability to grant access to several tiers of administrators so that, for example, a Property Manager may be granted access to the entire content of the application, while a Section Manager or a General Content Manager may only be granted access to specific portions of the content of the application relevant to their respective functions.

According to various aspects of the current invention, an implementation of the CMS may include providing a user with a main navigation menu that may include a plurality of top level menu items. According to various aspects, when the user of a smart device selects a top level menu item by, for example, tapping on or otherwise selecting an icon representing the menu item on the screen of the smart device, then graphics and/or one or more sub-level menu navigation items may be displayed to the user. When the user selects one of the sub-level menu navigation items, for example, by tapping on the sub-level menu navigation items, then information relevant to the sub-level menu item may be displayed to the user. According to various aspects, one or more of the sub-level menu items may each include one or more third, fourth, or lower level menu items, so that selecting these sub-level menu items may result in the display of the lower level menu items.

Additional advantages and novel features of aspects of the invention will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following figures, wherein:

FIGS. 1(a) and 1(b) are diagrams illustrating a plurality of top level menu items displayed to a user, according to various aspects of the current invention;

FIGS. 2(a)-2(f) are diagrams illustrating a display of a plurality of views corresponding to a "Home" menu item, according to various aspects of the current invention;

DETAILED DESCRIPTION

Figure 2D:
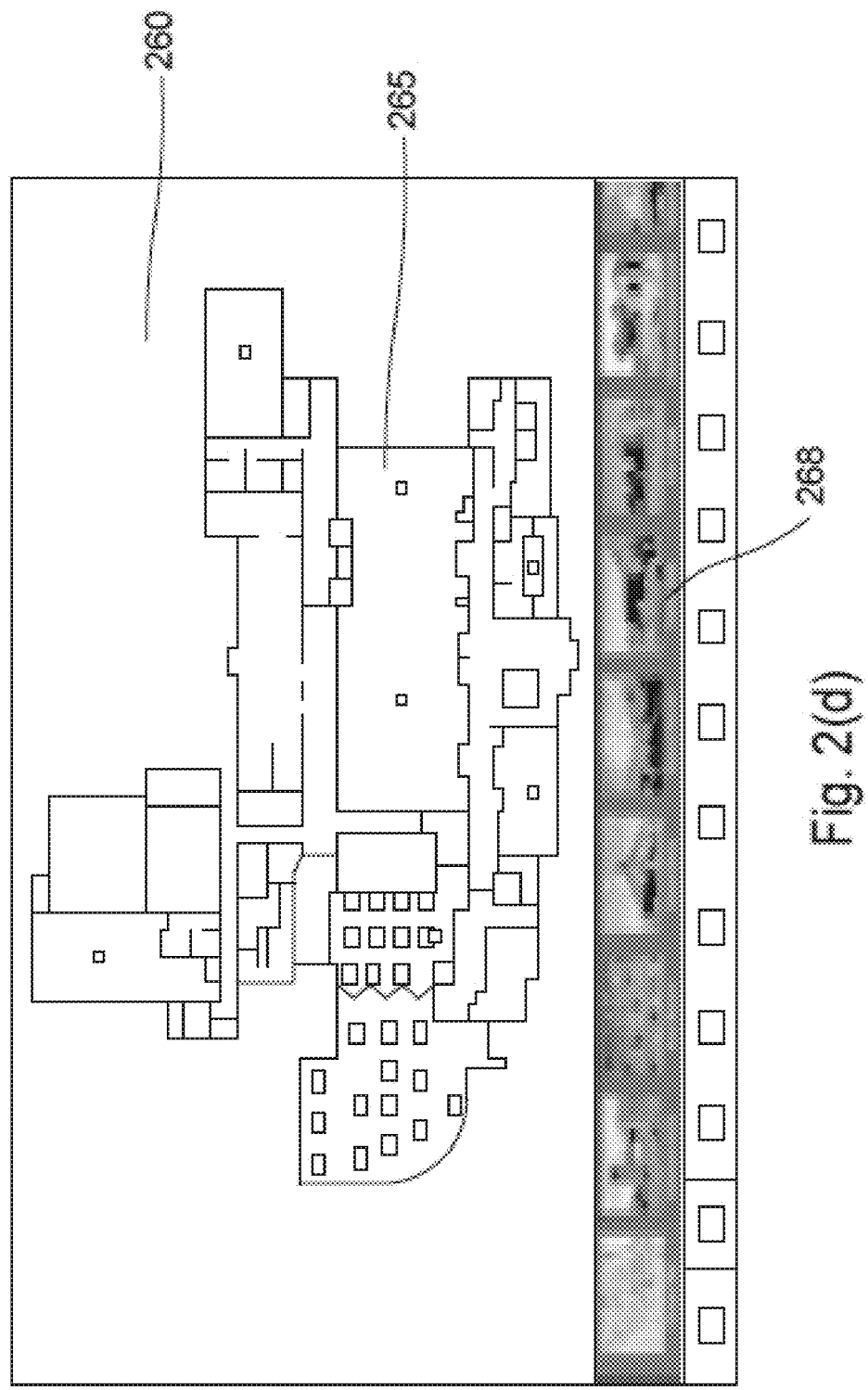

These and other features and advantages in accordance with aspects of this invention are described in, or are apparent from, the following detailed description thereof.

FIGS. 1(a) and 1(b) are diagrams illustrating a plurality of top level menu items displayed on a portion of a screen displayed to a user, according to various aspects of the current invention. In FIGS. 1(a) and 1(b), a plurality of top level menu items 120 are displayed as icons at the bottom of the screen 110, such as the screen of a smart device, but may be displayed on any suitable portion of the screen. According to various aspects, when the user of the smart device selects any of the icons 120, for example by tapping the icon 120, a sub-level menu 130 corresponding to the selected icon may be displayed, as illustrated in FIG. 1(a). In the aspects illustrated in FIGS. 1(a) and 1(b), the various top level menu items 120 shown include Home, Amenities, Attractions, Reservation and Contact. Other top level menu items or icons may be added, according to various aspects. Also, the display of the icons 120 may be in the form of a sliding shelf that is either always present at a portion of the screen, or that appears when the user selects the screen 110, for example by tapping the screen 110. According to various aspects, the sub-level menus 130 corresponding to each menu item 120 may be displayed, for example, as a list of items, as illustrated in FIG. 1(a), or as a list of illustrations, as illustrated in FIG. 1(b), in which case the sub-level items may be slightly transparent and superimposed to the background image displayed on the screen of the smart device. According to various aspects, the text displayed on the screen may be enlarged by the user in order to facilitate reading of the various items, for example via "small A" and "large A" graphics. Accordingly, the application may allow the user to have an overview of all options available by simply tapping on the screen of the smart device.

FIGS. 2(a)-2(f) are diagrams illustrating a display of a plurality of views 200 corresponding to a "Home" menu item, according to various aspects of the current invention. FIG. 2(a) illustrates an image that may appear to the user when the user selects, for example by tapping, the screen 210 of the smart device at the location of the icon titled "Home," similarly to as discussed above with respect to FIGS. 1(a)-1(b). When the "Home" menu is displayed, an application may be launched via the CMS to display the default landing screen, which may include an area map 220. According to various aspects, the map 220 may be highly interactive, and the user may explore the map 220 by selecting the screen 210, for example via a single or double tap of the screen 210 of the smart device, or via a finger or other motion in either direction on the screen 210 of the smart device. According to various aspects, one or more "hot spots" 230 may be defined on the map that may be used to explore specific areas of the map when the user selects a given "hot spot" 230. The user may thus explore a plurality of portions of an image, such as a map, by selecting one or more of the various "hot spots" 230, and each selection may launch a new display via the CMS, and the new display may also contain additional hotspots that, when selected, provide additional displays to the user. According to various aspects, the "hot spots" 230 may be embedded in various portions of a displayed image of the facility, for example, each "hot spot" 230 corresponding to a specific portion of the facility. Accordingly, when the user selects a given "hot spot" 230, one or more menus, text, images or videos that are specifically related to the portion of the facility to which the "hot spot" 230 corresponds may be provided or displayed to the user.

According to various aspects, the "Home" menu 120 illustrated in FIGS. 1(a)-1(b) may include a plurality of sub-level menu items 240, such as "About," "Campus," Pictures" and/or "Videos." FIG. 2(b) illustrates the display 250 that is launched by the application according to various aspects for the sub-level menu 240 "About." When selecting, e.g., by tapping, the "About" icon 240 on the screen 210 of the smart device, the user may be presented with both text and imagery 250, that may also include lower-level icons 260 that may be further selected to display additional text, pictures or videos. The "About" display 250 may include information about the facility, such as location, name, date of creation, mission, and the like.

According to various aspects, FIGS. 2(c)-2(d) illustrate screens 260 and 270 that may be launched by the CMS when the sub-level menu icon 240 "Campus" is selected, e.g., tapped, by the user. When the "Campus" icon 240 is selected by the user, a high level campus map 260 may be displayed to the user, and the user may be able to explore various portions of the campus map and navigate the campus map, such as by moving the user's finger over "hot spots" 265 on the screen of the smart device. According to various aspects, the "Campus" map 260 may have additional lower-level menus 268 to allow the user to navigate to various areas of the map quickly and efficiently, such as by simply tapping on the screen of the smart device at the location of the lower level menus 268.

Figure 2E:
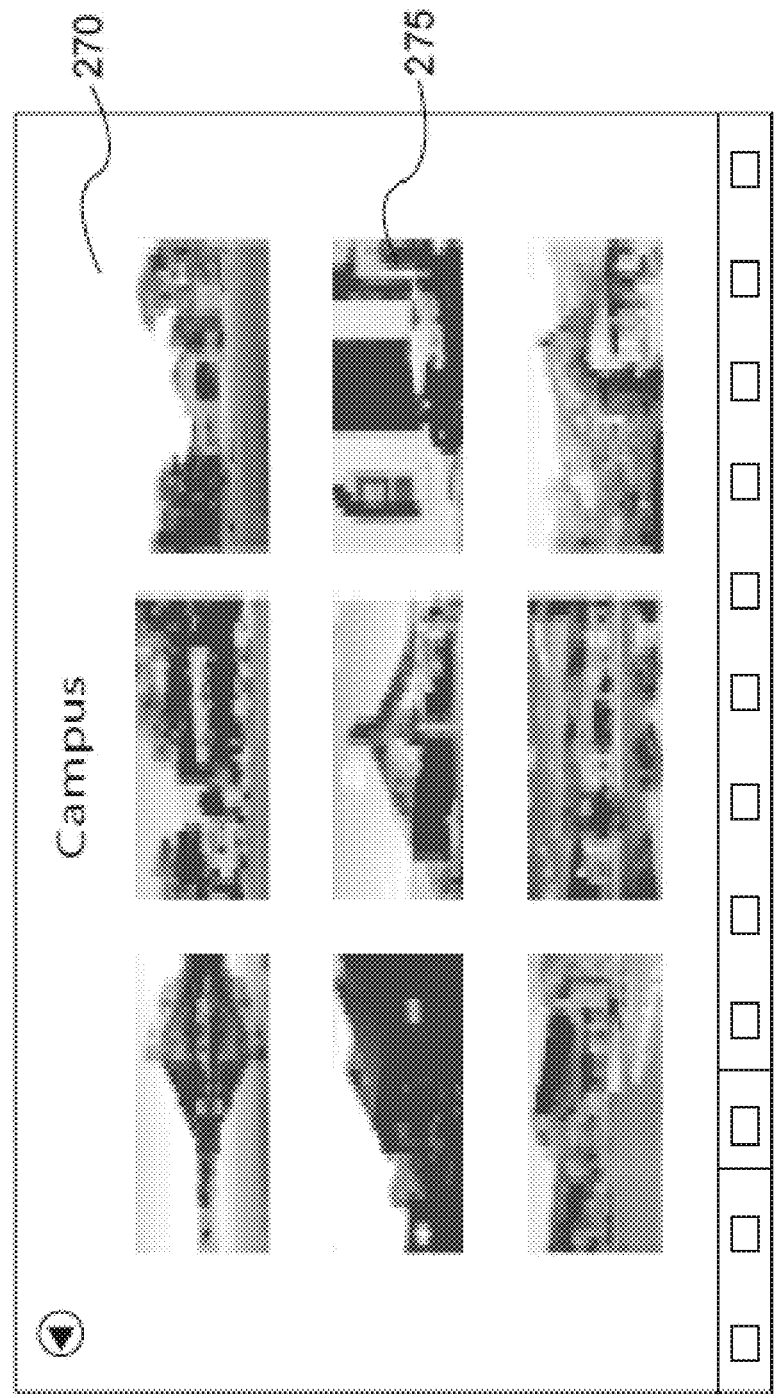

According to various aspects, FIG. 2(e) illustrates a display 270 that may be launched via the CMS if the sub-level menu 240 "Pictures" illustrated in FIG. 2(a) is selected, e.g., tapped, by the user. According to various aspects, when the "Pictures" icon 240 is selected by the user, the CMS may provide a gallery 270 of pictures on the display of the smart device, where the gallery of pictures 270 may be organized in stacks or albums of pictures, or may merely include a plurality of individual pictures, for example. According to various aspects, when the user selects an album or stack of pictures 270, for example by single tapping or double tapping a given picture icon 275 corresponding to a given album, another screen may launch to display the pictures that are included in the given album 275. According to various aspects, when the user selects a picture from the album 275, for example by tapping the picture icon, then the application may launch the selected picture via the CMS, and the picture may be, for example, displayed in a large format on the screen of the smart device. The application may also launch a slide show, such as if the user selects a "slide option" on the screen menu. According to various aspects, tapping on or otherwise selecting each gallery 275 may provide the gallery to the user and display the stack of images, and tapping on each image from that gallery 275 may enlarge the image to full screen. When in a gallery, the user may be able to flick from left to right, right to left, up to down or down to up, for example, from one picture to the next. According to various aspects, when a given image is selected, a "postcard" menu item of the selected image may be displayed on the screen, which may allow the user to enter an email address, a telephone number, or a postal address, on the selected picture, and to send that picture along with an accompanying message to the email address in the form of a postcard, or to a portable device, in the form of a text message for example.

According to various aspects, FIG. 2(f) illustrates a screen that may be launched by the application if the sub-level menu "Videos" 240 is selected, e.g., tapped, by the user. In FIG. 2(f), several videos or video stacks 285 are displayed as smaller icons on the display screen 280 of the smart device. For example, if the user selects a given video stack 285, then a new display may be launched via the CMS, and the videos included in the selected video stack 285 may be displayed to the user as a gallery of smaller icons on the screen of the smart device. According to various aspects, when the user selects a specific video from the displayed gallery of videos, such as via tapping the screen or via another selecting method, the video may be displayed on a similar-sized or larger screen of the smart device. When the video is displayed, a sub-menu of video controls may also be displayed to the user on a portion of the screen, the control including, for example, buttons for playing the video, stopping, rewinding and fast forwarding, as well as volume and image quality control buttons and other video control features.

Figure 3A:
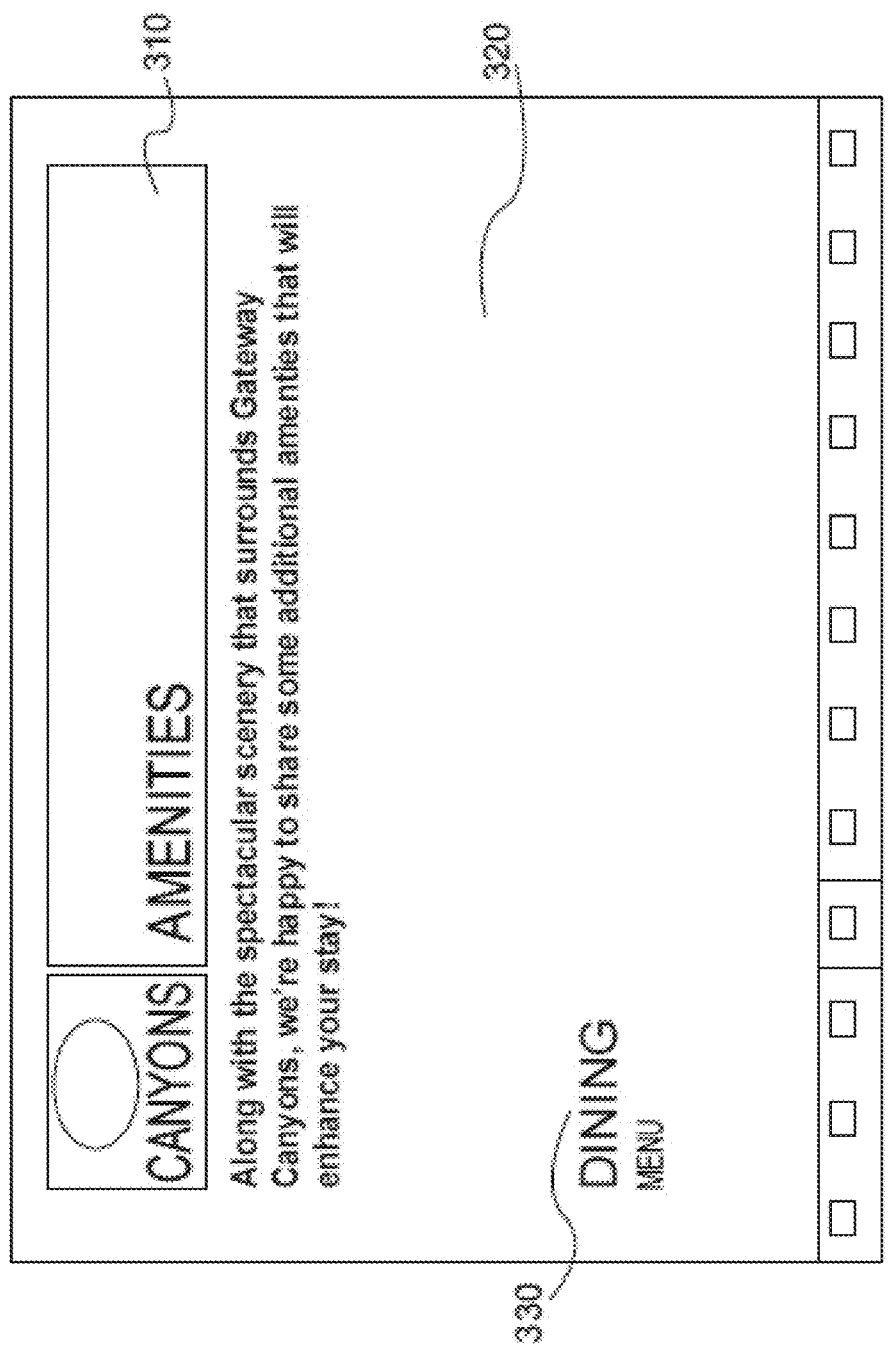
FIGS. 3(a) and 3(b) are diagrams illustrating a plurality of views corresponding to an "Amenities" menu item, according to various aspects of the current invention.
Figure 3B:
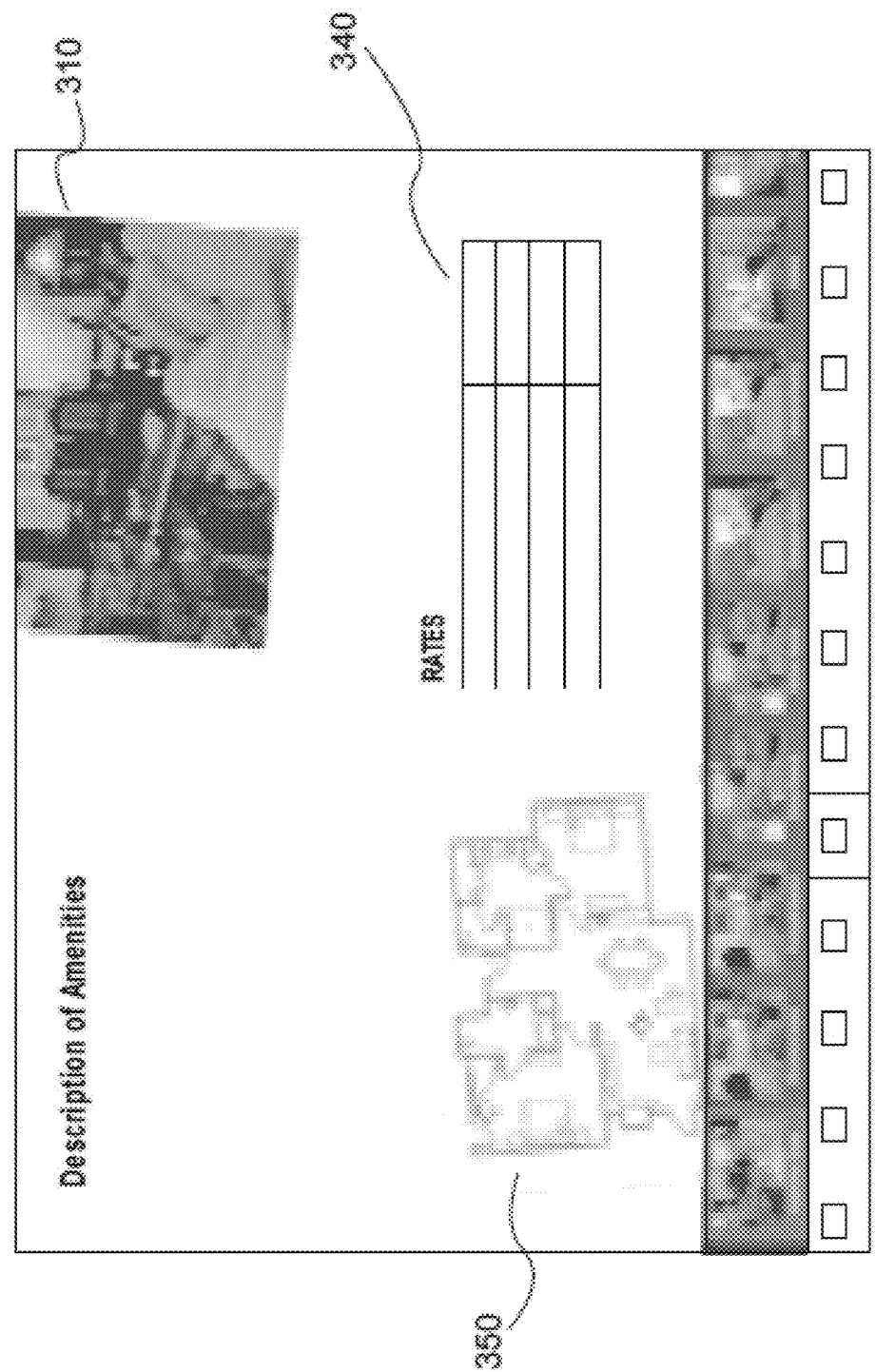

FIGS. 3(a)-3(b) are diagrams illustrating a display of a plurality of views corresponding to an "Amenities" and "Lodging" menu items, according to various aspects of the current invention. According to various aspects, the "Amenities" screen 310 illustrated in FIG. 3(a), when selected by the user via, for example, tapping on the screen 310 of the smart device, may launch an application or display 320 via the CMS to provide the user with a list, which may includes text, pictures and/or videos, of the various amenities available at the facility. The user may select individual images or icons 330 representing individual amenities, such as dining, leisure, business facilities, and the like, and/or a picture, a text and/or a video corresponding to the specific amenity selected by the user may be displayed on the screen of the smart device as a result of the selection. According to various aspects, the display 320 corresponding to the specific amenity may also be launched by the CMS as a pop-up window on the screen. It should be noted that pictures from any of the menu item may also be stored in the "Pictures" menu, and videos from any sub-level menu item may also be stored in the "Videos" menu.

FIG. 3(b) illustrates a display of a "Lodging" menu item, according to various aspects. When tapping on the "Lodging" screen 130, CMS may launch a list of accommodation choices 340 to be displayed to the user. For example, each accommodation choice may feature one or more images, videos and/or text to describe the various accommodations available to the user at the facility. For example, the layout of various rooms 350 may be displayed on the screen 310, and an icon to book a room via the smart device may also be displayed on a portion of the screen 310. According to various aspects, if the user selects an icon to book a room, then a booking application may be launched via the CMS, and an interactive page or a booking screen may be displayed to the user, where the user may enter, for example, name, address and credit card information. For example, the booking screen may include a webkit view of the booking website for the facility.

Figure 4A:
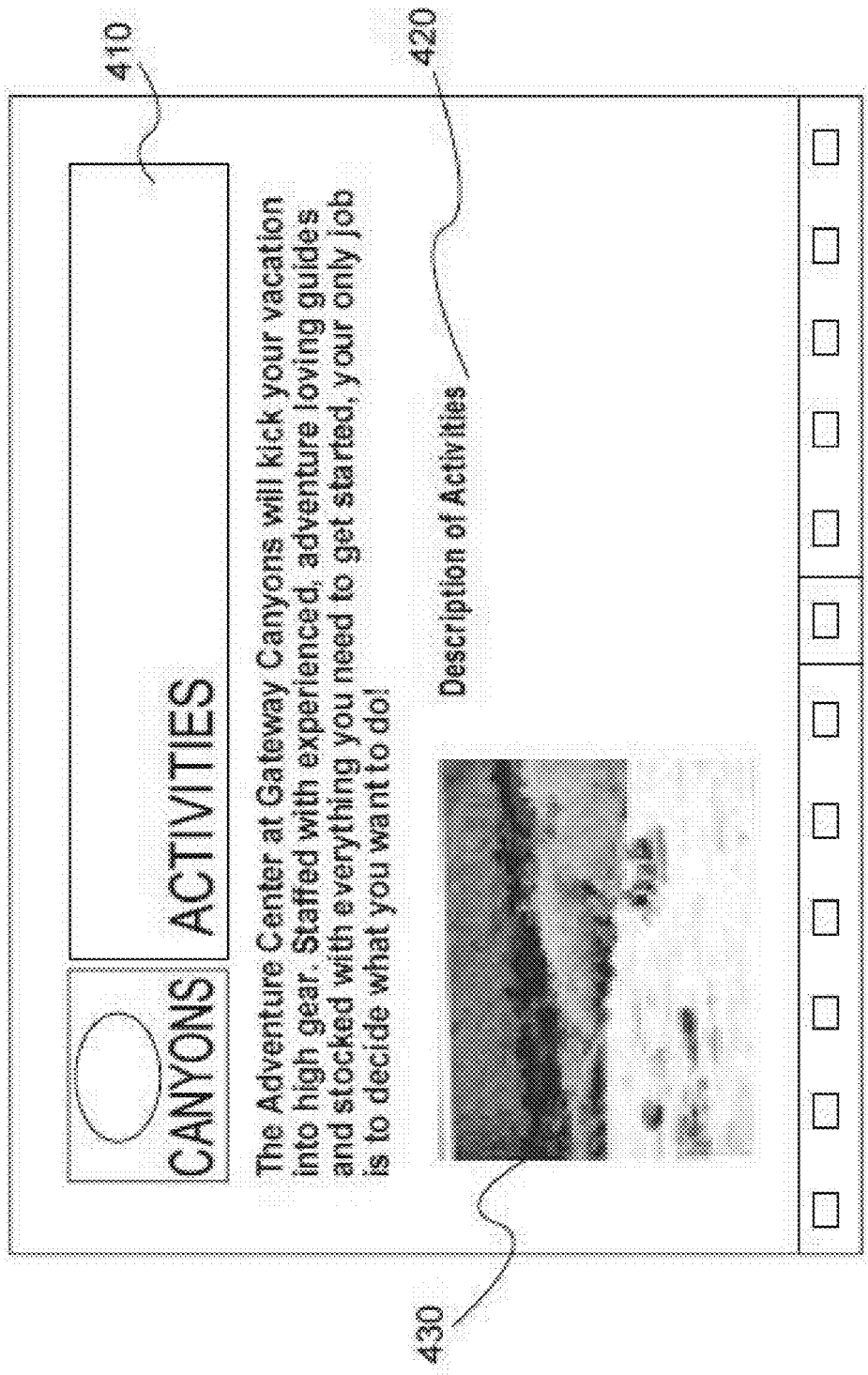
FIGS. 4(a) and 4(b) are diagrams illustrating a plurality of views corresponding to an "Attractions" menu item, according to various aspects of the current invention.
Figure 4B:
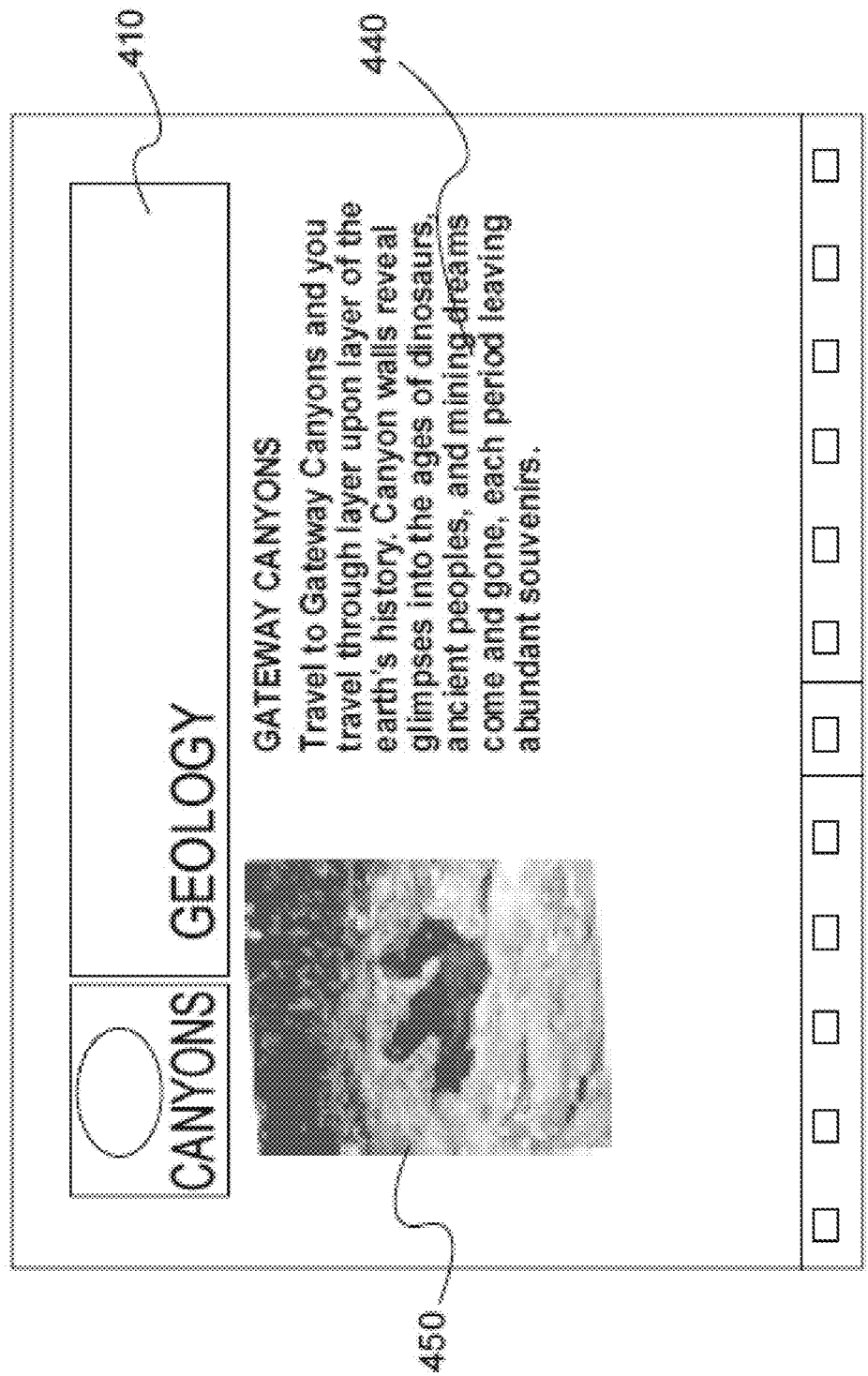

FIGS. 4(a)-4(b) are diagrams illustrating a display of a plurality of views corresponding to the "Activities" and "Geology" menu items, according to various aspects of the current invention. FIG. 4(a) illustrates a display of an "Activities" screen 410, according to various aspects. When the user selects the "Activities" menu, a list 420 of activities available at the facility may be displayed to the user. For example, if the facility is a vacation resort, then a plurality of leisure activities 420, such as hiking, swimming in a pool, dining, and the like, may be displayed on the screen of the user's smart device via the CMS. For example, each activity choice may feature one or more images 430, videos and/or text to describe the various activities available to the user at the facility, and may be provided to the user as a pop-up window on the screen of the smart device. FIG. 4(b) illustrates a display of a "Geology" menu item, according to various aspects, which may provide to the user a vivid representation, via pictures and/or videos as well as text, for example, of the geology surrounding the facility. The user may explore the various portions of the surrounding geology by selecting the screen 410 of the smart device by, for example, tapping various portions of the screen, or flicking the screen to the left, right, upwards or downwards. "hot spots" 440 and 450 may also be provided via the CMS to further explore specific areas of the facility surroundings.

According to various aspects, the "Attractions" menu may also include as a sub-menu a "History" icon that provides the user with a narrative of the history of the facility via text, pictures and/or videos, each of which may be activated, for example, when the user selects respective icons on the screen of the smart device.

According to various aspects, a "Reservations" menu may also be provided to the user to allow the user to make a reservation directly from the smart device, where, when the user selects the "Reservations" icon, a reservations application is launched via the CMS. A "Contact" menu may also be displayed, to provide the user with pertinent contact data for the facility, and enable display images, videos and text with links, telephone numbers and other data. A "Directions" icon may also be displayed on the screen to provide the user with directions on how to access the facility. According to various aspects, the directions may be provided by using a Global Positioning Feature (GPS), to provide customized directions to the user based on the user's location at the time of the search.

Figure 5:
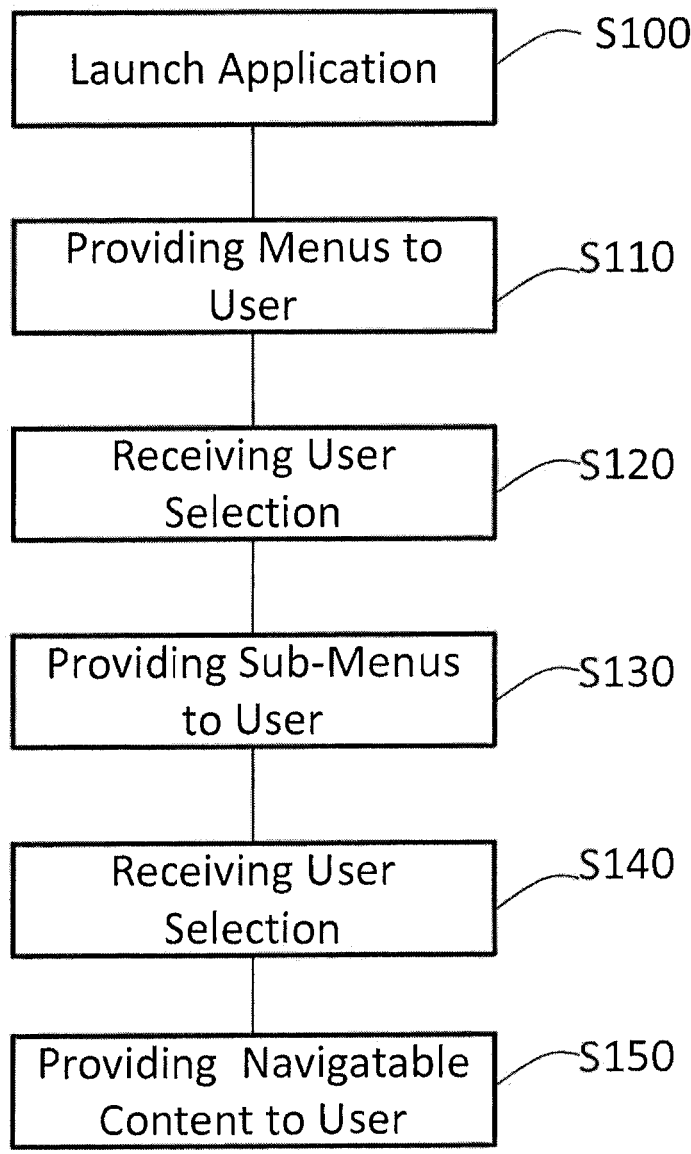
FIG. 5 is a flow chart illustrating a method of facilitating navigation of a facility, according to various aspects of the current invention.

FIG. 5 is a flow chart illustrating a method of facilitating virtual navigation of a facility, according to various aspects of the current invention. In FIG. 5, the method starts at S100, where a user launches an application on a smart device, such as a computer, a smart phone or a tablet. According to various aspects, when the application is launched, one or more graphics and a plurality of menu items may be provided to the user at S110. Accordingly, the user may enter a selection of the menu items at S120. According to various aspects, the selection of a given menu item may be performed by tapping one or more times the screen of the smart device at the location on the screen of the desired menu item with a finger, or by otherwise selecting the desired menu item by the user via any other method such as moving a mouse or any other urging or other selection method.

According to various aspects, when the desired menu item is selected, then graphics and/or one or more sub-level menus may be displayed to the user at S130 via the CMS. Accordingly, the user may either navigate the graphics or select one of the displayed sub-level menus. Navigating the graphics may be performed by, for example, selecting one or more CMS activated "hot spots" present at various locations on the graphics, each one of the "hot spots", when selected, causing the launch of a sub-application to display additional relevant information corresponding to the "hot spot" being selected, the information being relevant to the given facility. At S140, the user may select one or more graphics, and/or other lower-level menu items, that are displayed to the user on the screen of the smart device. According to various aspects, other multimedia information, including text, videos and pictures, may be displayed to the user at S150 as a result of the user's selection at S140, and the user may navigate the displayed graphics by, for example, selecting various "hot spots" and/or other menu items, pictures, videos, and the like, to gain better virtual access to the facility.

Figure 6:
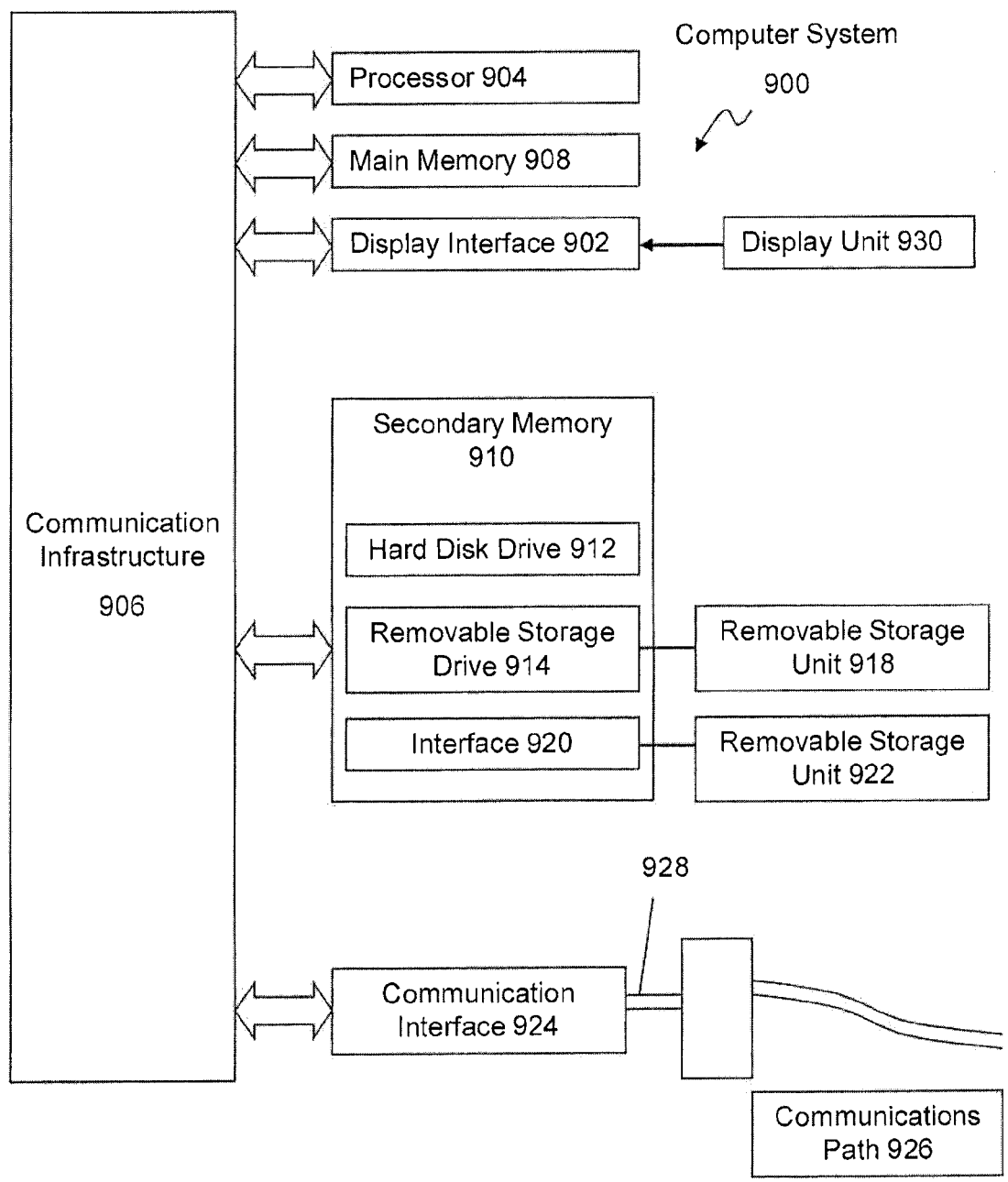
FIG. 6 presents an example system diagram of various hardware components and other features, for use in accordance with an aspect of the present invention.

FIG. 6 presents an example system diagram of various hardware components and other features, for use in accordance with an aspect of the present invention. Aspects of the present invention may be implemented using hardware, software, or a combination thereof and may be implemented in one or more computer systems or other processing systems. In one exemplary variation, aspects of the invention are directed toward one or more computer systems capable of carrying out the functionality described herein. An example of such a computer system 900 is shown in FIG. 6.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. Aspects of the invention are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present invention, as discussed herein. In particular, the computer programs, when executed, enable the processor 910 to perform such features. Accordingly, such computer programs represent controllers of the computer system 900.

In variations where aspects of the invention are implemented using software, the software may be stored in a computer program product and loaded into computer system 900 using removable storage drive 914, hard drive 912, or communications interface 920. The control logic (software), when executed by the processor 904, causes the processor 904 to perform the functions in accordance with aspects of the invention as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the invention are implemented using a combination of both hardware and software.

Figure 7:
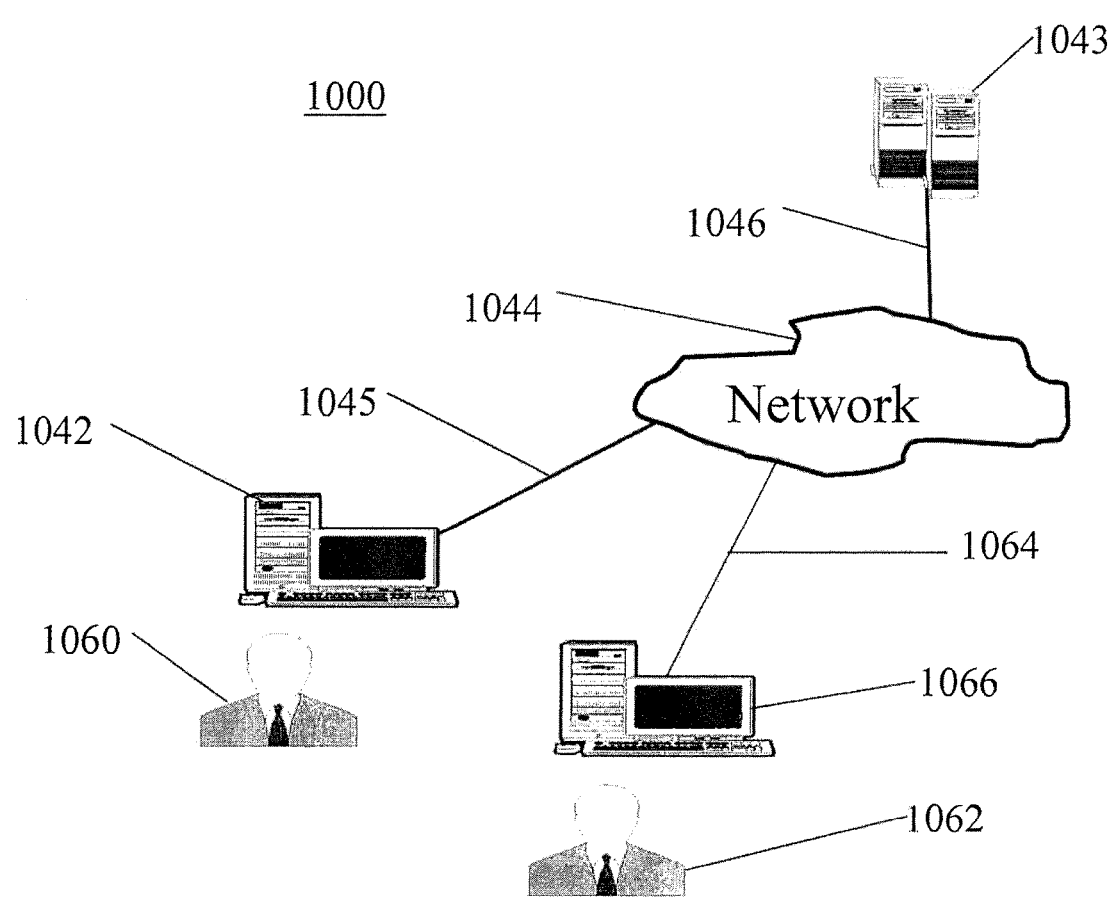
FIG. 7 is a block diagram of various example system components, in accordance with an aspect of the present invention.

FIG. 7 is a block diagram of various example system components, in accordance with an aspect of the present invention. FIG. 7 shows a communication system 1000 usable in accordance with the present invention. The communication system 1000 includes one or more accessors 1060, 1062 (also referred to interchangeably herein as one or more "users") and one or more terminals 1042, 1066. In one aspect, data for use in accordance with aspects of the present invention is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another example variation, the method and system in accordance with aspects of the present invention operate in a stand-alone environment, such as on a single terminal.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and thereof. Therefore, aspects of the invention are intended to embrace all known or later-developed alternatives, modifications, variations, improvements, and/or substantial equivalents.

What is claimed is:

1. A method for facilitating navigation of a facility to a user of a smart device comprising:

providing a plurality of selectable menu items on an image of the facility displayed on a screen of the smart device, wherein at least one of the selectable menu items have at least a plurality of predetermined hot spots associated with the menu item;

receiving a selection of one of the selectable menu items from the user;

providing the plurality of predetermined hot spots and a plurality of horizontally arranged adjacent directly selectable sub-menu items to the user in response to receiving the selection of the selectable menu item, wherein the sub-menu items are selected from a predetermined group of sub-menu items previously determined to be relevant to each respective hot spot of the plurality of predetermined hot spots; the selectable menu item being selected via flicking of the screen by the user;

displaying at least one image to the user;

presenting a postcard menu item to the user, wherein upon user selection of the image and the postcard menu item, a virtual postcard of the selected image is generated that can be sent by the user via electronic message;

receiving user input including at least one selected from a group consisting of a user address and a message; and sending a personalized virtual postcard comprising the user input along with the selected image;

wherein the selectable menu items and the selectable sub-menu items provide information to facilitate the navigation of the facility by the user.

2. The method of claim 1, wherein:

the plurality of predetermined hot spots are embedded in a displayed image of the facility, each hot spot corresponding to a specific portion of the facility; and a selection of one of the hot spots by the user provides the user with at least one of menus, text, images or videos related to the portion of the facility to which the selected hot spot corresponds.

3. The method of claim 1, wherein receiving the selection of one of the selectable menu items from the user is achieved via the display screen of the smart device.

4. The method of claim 1, wherein the navigation of the facility is provided as an application for use on the smart device.

5. The method of claim 4, wherein information is input into the application by a content management system, the content management system configured to receive content from an administrator and to enter the content into the application.

6. The method of claim 5, wherein the content management system is configured to grant multiple tiers of administrative access, the method further comprising:

providing administrative access to the entire content of the application to a first level of administrator; and providing administrative access to a limited portion of the application to a second level of administrator, the limited portion comprising at least one hot spot.

7. The method of claim 1, wherein the selectable sub-menu items include selectable sub-menu items relating to at least two selected from a group consisting of activities, geology, amenities, attractions, reservations, and lodging associated with the hot spot.

8. The method of claim 1, wherein the virtual postcard is configured to be sent by the user via at least one selected from a group consisting of a text message and email.

9. A system for facilitating navigation of a facility on a smart device, the system comprising:

means for providing a plurality of selectable menu items on an image of the facility displayed on a screen of the smart device, wherein at least one of the selectable menu items have at least a plurality of predetermined hot spots associated with the menu item;

means for receiving a selection of one of the selectable menu items from the user;

means for providing the plurality of predetermined hot spots and a plurality of horizontally arranged adjacent directly selectable sub-menu items to the user in response to receiving the selection of the selectable menu item, wherein the sub-menu items are selected from a predetermined group of sub-menu items previously determined to be relevant to each respective hot spot of the plurality of predetermined hot spots; the selectable menu item being selected via flicking of the screen by the user;

means for displaying at least one image to the user;

means for presenting a postcard menu item to the user, wherein upon user selection of the image and the postcard menu item, a virtual postcard of the selected image is generated that can be sent by the user via electronic message;

means for receiving user input including at least one selected from a group consisting of a user address and a message; and means for sending a personalized virtual postcard comprising the user input along with the selected image;

wherein the selectable menu items and the selectable sub-menu items provide information to facilitate the navigation of the facility by the user.

10. The system of claim 9, wherein:

the plurality of predetermined hot spots are embedded in a displayed image of the facility, each hot spot corresponding to a specific portion of the facility; and a selection of one of the hot spots by the user provides the user with at least one of menus, text, images or videos related to the portion of the facility to which the selected hot spot corresponds.

11. A computer program product comprising a non-transitory computer usable medium having control logic stored therein for causing a computer to facilitate navigation of a facility on a smart device, the control logic comprising:

computer readable program code means for providing a plurality of selectable menu items on an image of the facility displayed on a screen of the smart device, wherein at least one of the selectable menu items have at least a plurality of predetermined hot spots associated with the menu item;

computer readable program code means for receiving a selection of one of the selectable menu items from the user; and computer readable program code means for providing the plurality of predetermined hot spots and a plurality of horizontally arranged adjacent directly selectable sub-menu items to the user in response to receiving the selection of the selectable menu item, wherein the sub-menu items are selected from a predetermined group of sub-menu items previously determined to be relevant to each respective hot spot of the plurality of predetermined hot spots; the selectable menu item being selected via flicking of the screen by the user;

computer readable program code means for displaying at least one image to the user;

computer readable program code means for presenting a postcard menu item to the user, wherein upon user selection of the image and the postcard menu item, a virtual postcard of the selected image is generated that can be sent by the user via electronic message;

computer readable program code means for receiving user input including at least one selected from a group consisting of a user address and a message; and computer readable program code means for sending a personalized virtual postcard comprising the user input along with the selected image;

wherein the selectable menu items and the selectable sub-menu items provide information to facilitate the navigation of the facility by the user.

12. The computer program product of claim 11, wherein:

the plurality of predetermined hot spots are embedded in a displayed image of the facility, each hot spot corresponding to a specific portion of the facility; and a selection of one of the hot spots by the user provides the user with at least one of menus, text, images or videos related to the portion of the facility to which the selected hot spot corresponds.

13. A system for facilitating navigation of a facility on a smart device, the system comprising:

a terminal;

a user interface functioning via the terminal; and a repository accessible via a processor using the terminal;

wherein the terminal is configured to:

provide a plurality of selectable menu items on an image of the facility displayed on a screen of the smart device, wherein at least one of the selectable menu items have at least a plurality of predetermined hot spots associated with the menu item;

provide a selection option for at least of one of the selectable menu items for the user to select via the screen of the smart device; and provide the plurality of predetermined hot spots and a plurality of horizontally arranged adjacent directly selectable sub-menu items to the user in response to receiving the selection of the selectable menu item, wherein the sub-menu items are selected from a predetermined group of sub-menu items previously determined to be relevant to each respective hot spot of the plurality of predetermined hot spots; the selectable menu item being selected via flicking of the screen by the user;

display at least one image to the user;

present a postcard menu item to the user, wherein upon user selection of the image and the postcard menu item, a virtual postcard of the selected image is generated that can be sent by the user via electronic message;

receive user input including at least one selected from a group consisting of a user address and a message; and send a personalized virtual postcard comprising the user input along with the selected image wherein the selectable menu items and the selectable sub-menu items provide information to facilitate the navigation of the facility by the user.

14. The system of claim 13, wherein:

the plurality of predetermined hot spots are embedded in a displayed image of the facility, each hot spot corresponding to a specific portion of the facility; and a selection of one of the hot spots by the user provides the user with at least one of menus, text, images or videos related to the portion of the facility to which the selected hot spot corresponds.

15. The system of claim 13, wherein the terminal is selected from a group consisting of a personal computer, a minicomputer, a main frame computer, a microcomputer, a hand held device, and a telephonic device.

16. The system of claim 13, wherein:

the processor is housed on a server selected from a group consisting of a personal computer, a minicomputer, a microcomputer, and a main frame computer; and the server is coupled to a network via a coupling selected from a group consisting of a wired connection, a wireless connection, and a fiberoptic connection.

17. The system of claim 16, wherein the repository is housed on the server.

* * * * *